April 23, 1968          K. WOLF          3,379,183
STARTER ARRANGEMENT FOR INTERNAL COMBUSTION ENGINES
Filed Aug. 11, 1966
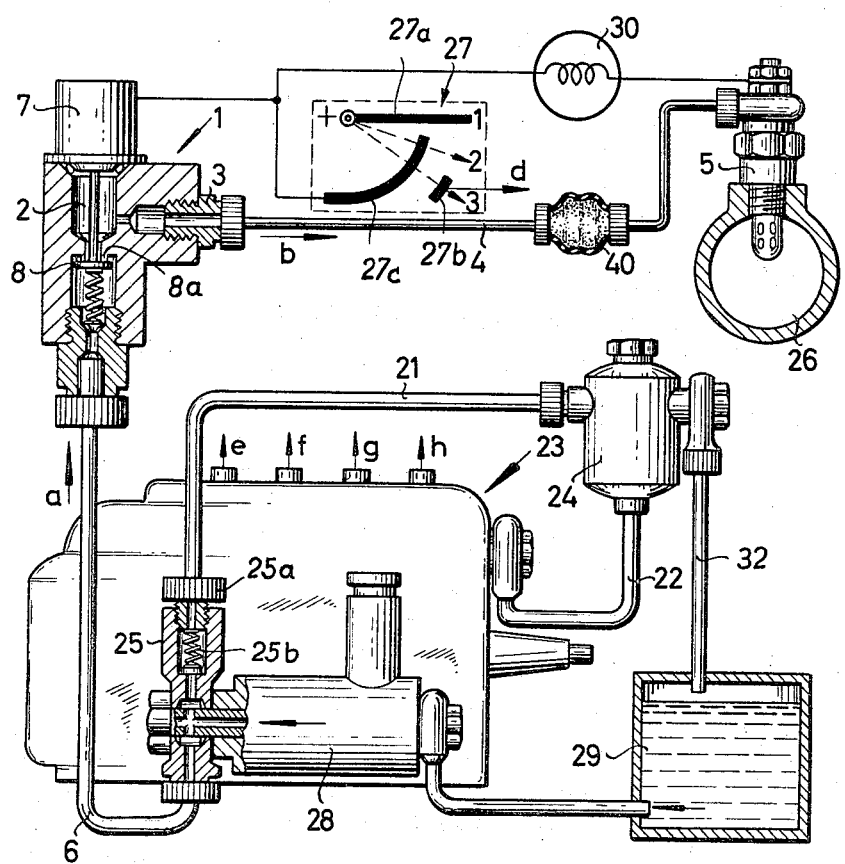
INVENTOR
Karl Wolf
by Michael S. Striker
Attorney

United States Patent Office 3,379,183
Patented Apr. 23, 1968

3,379,183
STARTER ARRANGEMENT FOR INTERNAL
COMBUSTION ENGINES
Karl Wolf, Stuttgart-Sonnenberg, Germany, assignor to Robert Bosch, GmbH., Stuttgart, Germany
Filed Aug. 11, 1966, Ser. No. 571,899
Claims priority, application Germany, Aug. 17, 1965, B 83,283
10 Claims. (Cl. 123—179)

The present invention relates to internal combustion engines of the type whose combustion chambers receive fuel from an injection pump. More particularly, the invention relates to a novel starter arrangement for such types of internal combustion engines.

It is an important object of the present invention to provide a starter arrangement which can preheat the combustion chambers of an internal combustion engine before such chambers receive fuel from the injection pump.

Another object of the invention is to provide a starter arrangement of the just outlined characteristics wherein a single preheating device suffices to preheat two or more combustion chambers.

A further object of the invention is to provide a novel connection between the fuel pump of the internal combustion engine and the preheating device of my improved starter arrangement.

An additional object of the invention is to provide a starter arrangement which insures that the above outlined preheating device receives fuel prior to admission of fuel to the injection pump.

A concomitant object of the invention is to provide a starter arrangement which can be readily built into presently known internal combustion engines of the type wherein the combustion chambers receive fuel from an injection pump.

A further object of the instant invention is to provide an internal combustion engine with fuel injection which embodies a starter arrangement of the above outlined characteristics.

Briefly stated, one feature of my invention resides in the provision of a novel and improved starter arrangement or starter system for internal combustion engines of the type having an intake manifold communicating with at least one combustion chamber which receives fuel from an injection pump and wherein the injection pump receives fuel from a fuel pump having a pipe connecting its pressure outlet with the intake of the injection pump and preferably containing a suitable fuel filter. The starter arrangement comprises at least one electrically heatable preheating device extending into the intake manifold, conduit means connecting the pressure outlet of the fuel pump directly with the preheating device, a pressure-responsive valve provided in the pipe between the pressure outlet of the fuel pump and the injection pump for delaying the admission of fuel to the injection pump when the fuel pump is started and begins to perform successive working strokes so that the preheating device receives fuel ahead of the injection pump, and heating means for raising the temperature of the preheating device so that fuel admitted by the conduit means is ignited and the resulting flame is propagated into and heats the combustion chamber or chambers before such chambers receive fuel from the injection pump.

The conduit means preferably accommodates an electromagnetic valve which is opened in response to heating of the preheating device and admits fuel to the latter. The pressure-responsive valve is preferably arranged to open in response to a pressure of at least 0.2 atmosphere absolute pressure.

In accordance with another advantageous feature of my invention, the conduit means preferably accommodates an expansion chamber which stores some fuel during each working stroke of the fuel pump and automatically admits such fuel to the preheating device during the intervals between successive working strokes of the fuel pump so that the preheating device receives fuel without interruptions and can bring about intensive preheating of each combustion chamber. As a rule, the preheating device will receive fuel not later than in response to the second working stroke of the fuel pump. This is due to the fact that the conduit means preferably accommodates relatively small amounts of fuel.

The novel features which are considered as characteristic of the invention are set forth in particular in the appended claims. The improved starter arrangement itself, however, both as to its construction and its mode of operation, together with additional features and advantages thereof will be best understood upon perusal of the following detailed description of a specific embodiment with reference to the accompanying drawing.

The single illustration of the drawing is a somewhat schematic side elevational view of a starter arrangement which embodies the present invention, with certain parts shown in section.

Referring to the drawing in detail, there is shown a starter arrangement which comprises an electromagnetic valve 1 having a valve space 2 and a nipple 3 which permits fuel to flow from the space 2 into a supply conduit 4. The supply conduit 4 contains a substantially cylindrical bellows 40 consisting of rubber or analogous elastomeric material. The discharge end of the supply conduit 4 is connected to an electrically heatable preheating device 5 such as a torch glow plug which receives fuel as soon as a fuel pump 28 produces pressure and sends fuel through a feed conduit 6 in the direction indicated by an arrow a. The starter arrangement further comprises a heating circuit for the device 5 including a control switch 27 which is illustrated in open or idle position. The movable contact 27a of this switch is connected to the positive pole of a source of electrical energy. The switch 27 is connected in circuit with the solenoid 7 of the valve 1 and with the preheating device 5. This circuit further includes a monitor 30. By closing the switch 27, i.e., by moving the contact 27a into engagement with a first fixed contact 27c, the operator will energize the solenoid 7 to move the valve member 8 away from its seat 8a. At the same time, the preheating device 5 is electrically heated and begins to glow. When the movable contact 27a is turned in a clockwise direction to such an extent that it engages a second fixed contact 27b which is connected with a conductor d, the engine begins to turn and the fuel pump 28 is started. At such time, the pump 28 delivers fuel solely to the space 2 of the valve 1 whose valve member 8 is already moved away from the seat 8a so that the fuel can flow through the supply conduit 4 and into the preheated preheating device 5. This is due to the fact that the feed conduit 6 is connected directly to the pressure outlet of the fuel pump 28 so that the preheating device 5 receives fuel without any delay following starting of the pump 28. Furthermore, the pipe 21 which supplies fuel to a filter 24 and which is also connected with the pressure outlet of the fuel pump 28 contains a pressure-responsive check valve 25 which opens in response to a pressure of not less than 0.2 atmospheres pressure. The filter 24 supplies fuel to a pipe 22 which is connected with an injection pump 23. The exact pressure at which the check valve 25 admits fuel into the filter 24 can be adjusted by a threaded plug 25a which controls the bias of a valve spring 25b. The suction inlet of the fuel pump 28 is connected with the fuel tank 29. This tank is further connected with an overflow pipe 32 of the filter 24.

It will be seen that the injection pump 23 will receive fuel only when the fuel pump 28 generates a pressure which suffices to open the check valve 25. Thus, the admission of fuel from the injection pump 23 through the fuel lines e, f, g, h and into the non-illustrated combustion chambers takes place with a predetermined delay following admission of fuel via conduits 6, 4, valve 1, and bellows 40 into the preheating device 5. The check valve 25 controls the delay with which the injection pump 23 receives fuel after the pump 28 has admitted fuel to the preheating device 5. This preheating device 5 is installed in the intake manifold 26.

The bellows 40 enhances the integration of the feed pressure, especially during the first working strokes of the fuel pump 28. This bellows 40 defines a pressure-equalizing expansion chamber which receives fuel delivered by the supply conduit 4 in the direction indicated by an arrow b and then expands to store a portion of intermittently delivered fuel. During the intervals between successive deliveries of fuel through the feed conduit 6, the bellows 40 dissipates energy which has been stored in its elastic material and thus continues to deliver fuel to the preheating device 5. In other words, the device 5 receives fuel without any interruptions despite the fact that the delivery of fuel by the pump 28 takes place intermittently. This increases considerably the amounts of fuel admitted to the preheating device 5 which is very desirable at the outset of a starting operation, especially since the engine does not as yet require oxygen for actual combustion of fuel in the chambers of the engine.

A very important advantage of a starter arrangement which utilizes the preheating device 5 is that a single preheating device can heat a series of combustion chambers by flames which are sucked into such chambers during starting. This preheating device replaces a series of glow wires or glow pin spark plugs and is electrically heated even before the engine begins to turn so that it can ignite fuel immediately after the engine is started.

A serious drawback of presently known starter arrangements is that the preheating means receives fuel with too much delay. This is due to the fact that the fuel tank is normally located at a level below the preheating means so that the engine must be equipped with a separate fuel tank for the preheating means, with a complicated system of fuel refilling and overflow devices, or with a separate fuel pump. Also, the fuel pump 28 does not generate sufficient fuel pressure immediately after the engine begins to turn. This will be readily understood since the pump 28 must first fill the pipe 21 which delivers fuel to the filter 24 and, in many instances, the filter 24 too must be filled prior to admission of fuel to the injection pump 23 proper. In heretofore known starter arrangements for internal combustion engines which receive fuel from an injection pump, the preheating means receives fuel simultaneously with i.e., not before, the injection pump. This results in losses in time and in excessive consumption of electrical energy.

The starter arrangement of the present invention overcomes the drawbacks of the just outlined conventional arrangements in that the check valve 25 insures delivery of fuel to the preheating device 5 prior to admission of fuel to the injection pump 23. This starter arrangement does not require a separate fuel tank or a separate fuel pump for the preheating device prior to admission of fuel sprays into the combustion chambers. As a matter of fact, the present invention actually takes advantage of unavoidable delays in the generation of pressure by the fuel pump 28. Since the conduits 6 and 4 which supply fuel to the preheating device 5 contain relatively small amount of fuel, the device 5 which has been preheated even before it receives fuel invariably receives requisite quantities of such fuel not later than in response to the second working stroke of the fuel pump 28. Such fuel is ignited and the resulting flame heats the combustion chambers at a time when such combustion chambers do not, as yet, receive fuel from the injection pump 23. This is highly desirable because, at such time, the combustion chambers are not maintained at optimum temperature and also because the first sprays of fuel admitted by the fuel lines e, f, g, h actually bring about a cooling of combustion chambers.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A starter arrangement for internal combustion engines of the type having an intake manifold communicating with at least one combustion chamber which receives fuel from an injection pump and wherein the injection pump receives fuel from a fuel pump having a pipe connecting its pressure outlet with the intake of the injection pump, said starter arrangement comprising a preheating device extending into the intake manifold; conduit means connecting the pressure outlet of the fuel pump with said preheating device; a pressure-responsive valve provided in the pipe between the fuel pump and the injection pump for delaying the admission of fuel to the injection pump when the fuel pump is started so that said preheating device receives fuel ahead of the injection pump; and heating means for raising the temperature of said preheating device so that fuel admitted by said conduit means is ignited and the resulting flame is propagated into and heats the combustion chamber before the latter receives fuel from the injection pump.

2. A starter arrangement as set forth in claim 1, wherein said pressure-responsive valve is a check valve which is arranged to open in response to a pressure of at least 0.2 atmospheres pressure.

3. A starter arrangement as set forth in claim 1, wherein the pipe between the fuel pump and the injection pump further contains a fuel filter located downstream of said pressure-responsive valve.

4. A starter arrangement as set forth in claim 1, further comprising an electromagnetic valve provided in said conduit means, said heating means comprising means for opening said electromagnetic valve prior to starting of the fuel pump.

5. A starter arrangement as set forth in claim 4, further comprising an expansion chamber provided in said conduit means downstream of said electromagnetic valve for storing a portion of fuel delivered thereto during successive working strokes of the fuel pump and for supplying the thus stored fuel to the preheating device during the intervals between such strokes.

6. A starter arrangement as set forth in claim 5, wherein said expansion chamber is defined by a substantially cylindrical bellows of elastomeric material.

7. A starter arrangement as set forth in claim 1, wherein said heating means comprises an electric circuit and control means provided in said circuit for completing the same and for thereby raising the temperature of said preheating device.

8. A starter arrangement as set forth in claim 1, wherein said conduit means can accommodate a relatively small amount of fuel so that said preheating device receives fuel not later than in response to the second working stroke of the fuel pump.

9. A starter arrangement as set forth in claim 1, further comprising means for adjusting said pressure-responsive valve.

10. A starter arrangement as set forth in claim 1, wherein said conduit means is connected directly to the pressure outlet of the fuel pump and wherein said conduit means contains means for storing some fuel during successive working strokes of the fuel pump and for automatically delivering such fuel to said preheating device during the intervals between such strokes.

References Cited

UNITED STATES PATENTS

| | | | |
|---|---|---|---|
| 2,229,714 | 1/1941 | Wirrer | 123—27 |
| 2,398,094 | 4/1946 | Heymann | 123—122 |
| 2,993,487 | 7/1961 | Konrad et al. | 123—179 |
| 3,338,226 | 8/1967 | Clark | 123—122 |
| 3,353,520 | 11/1967 | Haag | 123—122 |

AL LAWRENCE SMITH, Primary Examiner.